United States Patent
Vlad

[15] 3,638,598
[45] Feb. 1, 1972

[54] WATER VEHICLE

[72] Inventor: John J. Vlad, 30232 Tecla Drive, Warren, Mich. 48093

[22] Filed: Jan. 7, 1970

[21] Appl. No.: 1,251

[52] U.S. Cl. ............................................... 114/16 A, 9/1 R
[51] Int. Cl. ........................................................ B63g 8/00
[58] Field of Search .................... 115/6.1; 114/16 A, 16, 16.4; 9/1 R

[56] References Cited

UNITED STATES PATENTS 3,101,691  8/1963  Wendt ................................ 114/16 A

FOREIGN PATENTS OR APPLICATIONS 642,815  7/1962  Italy ...................................... 114/16 A Primary Examiner—Trygve M. Blix
Attorney—Hauke, Gifford and Patalidis

[57] ABSTRACT

A water vehicle on which a rider may be towed by a boat or the like either on or beneath the surface of the water. The water vehicle comprises a substantially U-shaped frame member having the arm members of a pair of plane or planar members rotatably mounted to each leg thereof and including a pair of handles carried by each arm member to permit the rider of the water vehicle to independently rotate the planes relative to one another and to the frame member to thereby control the motion of the water vehicle while it is being towed by the boat. The ends of each leg of the U-shaped frame member are curved outwardly therefrom and are adapted to cooperate with the arm handles to permit the water vehicle to be mounted to the sides of a boat or the like whereby the water vehicle functions as a ladder to permit entry into the boat.

15 Claims, 5 Drawing Figures

PATENTED FEB 1 1972 3,638,598
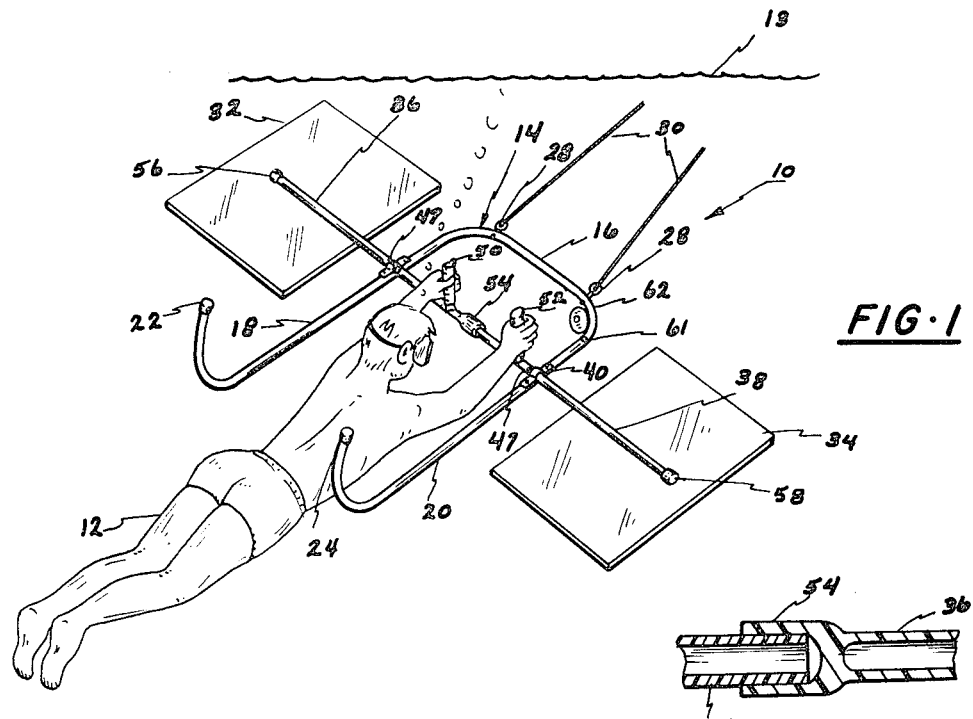
FIG·1
FIG·4
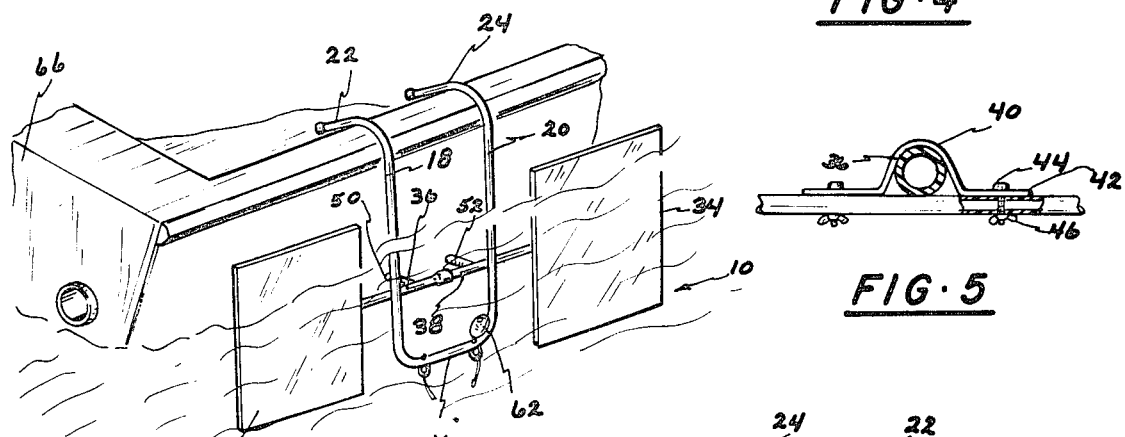
FIG·2
FIG·5
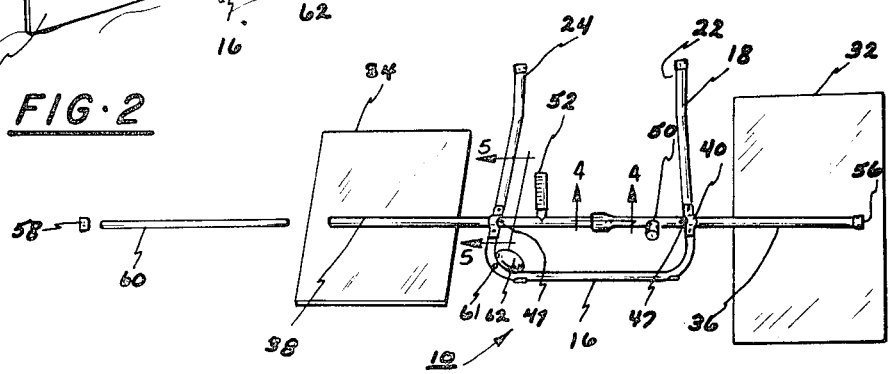
FIG·3
INVENTOR
JOHN J. VLAD
BY
Hauke Gifford & Patalidis
Attorneys

WATER VEHICLE

BACKGROUND OF THE INVENTION

I. Field of the Invention

This invention relates to water vehicles, and more particularly, to a water vehicle adapted to be towed behind a motor boat or the like in which the rider thereof controls the motion of the vehicle either on or beneath the surface of the water.

II. Description of the Prior Art

Heretofore water vehicles have been provided with planes so arranged that the rider thereof can control the motion of the vehicle as the same is towed through the water by a motor boat or the like. Although such previously used water vehicles have generally operated in a satisfactory manner, they have a number of inherent disadvantages. For instance some of the previously used water vehicles have planes with support handles attached thereto for operation by the rider to maneuver the vehicle through the water. A rapid descent in such vehicles is not possible because the rotation of the plane is limited by contact with the rider's arms when the planes have been rotated through a limited arc. When it is desired to turn such vehicles, the planes are normally rotated in opposite directions with the same results, that is, one of the planes will come into contact with the forearm of the rider thus limiting the rider's capability for a rapid turn. Since injury or accident can sometimes be avoided by rapid maneuvering such devices add unnecessary dangers to the use of water vehicles of this type.

Still other of the previously used water vehicles have been designed such that they have sufficient buoyancy to float to the surface when the rider releases them. This limits their use if the rider wishes to explore the bottom of the body of water independently of the vehicle. The water vehicle will return to the surface of the water, thereby causing inconvenience to the rider who will also have to return to the surface in order to again utilize the vehicle.

In addition to the inconvenience to the rider, the automatic return to the surface of the water by the vehicle is a potential water hazard to boats, water skiers and swimmers on the surface.

It would therefore be desirable to provide a water vehicle adapted to be towed behind a motor boat or the like in which the rider thereof is permitted to control the motion of the vehicle in an easy and efficient manner and without the disadvantages of the previously used devices.

SUMMARY OF THE INVENTION

The present invention, which will subsequently be described in greater detail, comprises a water vehicle adapted to be towed by a motor boat or the like and includes a pair of planes rotatably mounted thereon to permit a controlled motion of the vehicle by the rider thereof.

The water vehicle comprises a substantially U-shaped frame member, the ends of each leg thereof being curved outwardly at approximately right angles to the frame member. The planes each have an arm member extending therefrom and rotatably mounted to the legs of the U-shaped frame member, the arms of each plane being in an end-to-end relationship and adapted for independent rotational movement relative to the frame member by handles carried on each arm member and operable by the rider of the vehicle. The handles of each plane are mounted to the arm members at a point which is inwardly spaced from its associated plane such that the rider thereof may grasp the handle and rotate them through 360° without interference with either plane. After use of the vehicle or to enter the water to begin use, the vehicle functions as a ladder by placing the curved ends over the side of the boat.

It is therefore an object of this invention to provide a water vehicle which is simple in its construction, inexpensive to manufacture, and does not have the disadvantages of the previously used water devices.

It is also an object of this invention to provide a water vehicle which functions as a ladder for use with motor boats or the like.

Other objects, advantages and applications of the present application will become apparent to those skilled in the art when the accompanying description of one example contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a perspective view of a water vehicle of the present invention, showing the position of the rider thereon;

FIG. 2 is a perspective view of the water vehicle of FIG. 1 but illustrating it being used as a ladder for a motor boat or the like;

FIG. 3 is a partially exploded perspective view of the water vehicle illustrated in FIGS. 1 and 2;

FIG. 4 is an enlarged fragmentary sectional view of the vehicle as taken on line 4—4 of FIG. 3; and FIG. 5 is another enlarged fragmentary sectional view of the vehicle taken on the line 5—5 of FIG. 3

DESCRIPTION OF THE PREFERRED EMBODIMENT

Referring now to the drawing, there is illustrated a water vehicle 10 on which a rider 12 is carried either on or beneath the surface of a body of water 13 as the water vehicle is towed therethrough by a motor boat or the like (not shown). The water vehicle 10 comprises a substantially U-shaped frame member 14 having a base 16 and a pair of legs 18 and 20, the respective ends 22 and 24 thereof being curved outwardly away from the frame member 14 as can best be seen in FIG. 1.

In the preferred embodiment, the frame member 14 is constructed from a tubular plastic material with the base 16 being approximately 18 inches wide and the legs 18 and 20 each measuring 36 inches in length. It is clear however that other materials and dimensions can be used. A pair of eyebolts 28 passing through holes in the base 16 are adapted to be attached to a pair of tow lines 30 which in turn are attached to the motor boat or the like to tow the water vehicle 10 and the rider 12 through the water.

Rectilinear-shaped planes or planar members 32 and 34 are carried on opposite sides of the frame member 14 by tubular arm members 36 and 38 respectively. The planes 32 and 34 and their associated arm members 36 and 38 are preferably constructed from a plastic material and are illustrated as being fused to one another. However, the planes 32 and 34 may be attached to their associated arm members by any suitable means such as a plurality of screws extending through the arm members and into the planes. Although the planar members 32 and 34 are illustrated as being of a rectilinear shape, they take other forms, such as an elongated wing shape.

The arm members 36 and 38 are each independently mounted to the legs 18 and 20 of the frame member 14 by clamps 40 as illustrated in FIG. 5. The clamps 40 are of a semicircular shape having flanges 42 on opposite sides thereof through which bolts 44 extend to securely attach the arm members 36 and 38 and the clamps 40 to the legs 18 and 20. Wingnuts 46 permit the clamps and arm members to be easily attached and detached from the legs 18 and 20. Lugs 47 securely attached to each of the arm members prevent the arm members from moving outwardly through the clamps 40. The clamps 40 engage their respective arm members in such a manner that the arm members are free to rotate in a clockwise or counterclockwise direction as seen in FIG. 5 when the rider 12 desires to maneuver the water vehicle 10 in a controlled manner, as will be explained hereinafter.

The arm members 36 and 38 each have a handle 50 and 52, respectively, which are inwardly spaced from their associated planes 32 and 34 and preferably within the confines of the frame member 14. The inner ends of the arm members 36 and 38 are telescoped one into the other for relative rotational movement independent of one another while also providing mutual lateral support for one another. As can be seen in FIG.

4, the arm member 36 has an enlarged end section 54 in which the end of the arm member 38 is inserted. The two arm members thus provide lateral support, while permitting independent rotational movement of the two arm members. The lugs 47 on the inner side of the arm members proximate the legs 18 and 20 and the coupling of the opposing ends of the arm members 36 and 38 prevents any substantial axial movement relative to the frame member 14.

The planes 32 and 34 are approximately 16 inches by 20 inches and approximately a quarter of an inch thick; the overall length as measured between the outer edges of the planes is approximately 60 inches.

The opposite ends of the arm members 36 and 38 have removably attached caps 56 and 58 respectively. As can be seen from the partially exploded view of FIG. 3, a ballast material 60 is adapted to be inserted in the tubular portion of each of the arm members 36 and 38 and the caps 56 and 58 are then secured in position to retain the ballast within each arm member. The caps 56 and 58 are made of a material of sufficient resiliency so as to permit then to be respectively snapped on and off the ends of the arm members 36 and 38. The ballast 60 is of sufficient weight so as to provide a negative buoyancy to the water vehicle 10. Thus, when the water vehicle 10 is not being towed, it will tend to sink to the bottom of the water 13. Although plastic is the preferred material for the construction of the water vehicle 10, it is to be understood that the water vehicle 10 can be made of other materials, such as metal or wood, and that the weight of the ballast 60 can be varied so as to be adaptable to the particular type of material used to construct the water vehicle 10. As for example, a wooden water vehicle might use a heavier ballast than the ballast necessary for a plastic water vehicle, and if the water vehicle were constructed of a heavy metal, ballast might not be necessary.

In operation, the rider 12 grasps the handles 50 and 52 respectively with his left and right hand, as viewed in FIG. 1, while the vehicle 10 is towed through the water 13 by a motor boat or the like by means of the tow line 30. The planes 32 and 34 can be rotated about the axis of the arm members 36 and 38 by the rider 12 moving the handles 50 and 52 in a clockwise or counterclockwise direction to cause the vehicle 10 to dive or to surface. For example, if the vehicle is below the surface and the rider wishes to be brought to the surface he will move the handles rearwardly so that the planes present a positive angle of attack to the water 13. This causes the front of the water vehicle to rise and the rider and the vehicle will glide to the surface of the water. If the rider wishes to go below the surface or to dive deeper, rotation of the handles 50 and 52 to cause the planes 32 and 34 to assume a negative angle of attack will produce a dive. In other words, rotating the planes to bring their forward edges below the horizontal, while the rearward edges are slightly above the horizontal, will cause the vehicle to dive beneath with water. This will cause the vehicle to move downwardly and to continue downwardly until the rider thereof chooses to level out the planes. Rotation of the planes to a substantially horizontal position will keep the attitude of the craft also horizontal to thereby maintain the vehicle at the desired depth. However, since the plane continuing tow lines 30 will actually be the reference plane and this will never be a horizontal plane and will change depending upon the depth of the vehicle, the angle of attack will not actually be relative to a horizontal plane; thus, if the rider reaches a level at which he wishes to ride horizontally under the water, it will be necessary for the rider to maintain the planes at some negative angle of attack relative to the tow lines 30. By moving the handles 50 and 52 in opposite directions and thus rotating the planes 32 and 34 in opposite directions, the rider thereof may steer the vehicle in any direction he desires.

It should be noted because the handles 50 and 52 as well as the planes 32 and 34 are disposed outwardly of his arms and do not support them as in some previous similar devices, the rider 12 of the vehicle 10 may rotate planes 32 or 34 either together or in opposite directions at as sharp an angle of attack as he desires without any interference between himself and the planes.

A communication system, generally indicated by the numeral 62, may consist of a buzzer for receiving signals from the boat and a button 64 for sending signals to the boat as is desired so that the rider of the vehicle 10 may communicate with the operator of the motor boat by using some predetermined code.

The curved ends 22 and 24 of the legs 18 and 20 provide a dual function. When the vehicle 10 is used in the water and it is desired to carry one or more riders in addition to the rider 12, the extra riders simply grasp the curved ends 22 and 24 and are carried along by the vehicle as it is towed through the water by the motor boat.

Referring to FIG. 2 for a description of a second function of the curved ends 22 and 24, it can be seen that the water vehicle 10 may also be used as a ladder for entry into a boat 66. In use as a ladder, the curved ends 22 and 24 of the legs 18 and 20 are attached to the top side of the hull of the boat 66, while the handles 50 and 54 abut against the side of the boat to maintain the ladder outwardly therefrom so that the user of the ladder may grasp the same and climb up without interference from the side of the boat. When the water vehicle 10 is being used as a ladder to enter the boat from the water, the base 16 of the frame member 14 acts as a bottom rung of the ladder while the coupled arm members 36 and 38 act as a second rung of the ladder.

The water vehicle 10 can be disassembled and stored in a very quick and easy manner simply by removing the wingnuts 46 and bolts 44 from the clamping members 40, thereby separating the two arm members 32 and 34 from the frame member 14, thus the water vehicle can be broken down to three separate, easily stored elements.

It can thus be seen that the present invention has provided a water vehicle which is easily capable of rider-controlled maneuvers under the water, such as a rapid ascent or descent or banking to the right or left or performing other stunt maneuvers.

It can also be seen that the present invention has provided a water vehicle which will come to rest at the floor of the body of water when the boat which is towing the same stops, thus the water vehicle is not a hazard to other persons, such as skiers or the like, or to boats at the surface of the water. This also provides an additional safety feature for the rider in that heretofore because the rider is ordinarily above these vehicles and they are generally more buoyant than he is if the towing motion of the boat should stop or the vehicle somehow becomes disconnected from the boat the vehicle would immediately begin to ascend and in doing so would often strike the rider on its way to the surface. In such situations with the present invention the vehicle sinks to the bottom out of the way.

It can also be seen that the present invention has provided a water vehicle which, in addition to having advantages hereinbefore pointed out, is also adaptable as a ladder for entry into a boat.

Having thus described the invention, what I claim is as follows:

1. A water vehicle by which a rider may be towed through a body of water by a motor boat or the like comprising:
a generally U-shaped frame member,
a pair of planar members each having an arm extending therefrom;
means for rotatably mounting said arms to said frame member such that each plane member extends outwardly therefrom;
a pair of handles adapted to be operated by said rider, one of said handles carried by one of said arms at a point inwardly spaced from its associated planar member, the other of said handles being carried by the other of said arms at a point inwardly spaced from its associated planar member whereby the rider of said water vehicle can rotate said planar members by movement of said handles relative to said frame member, said leg ends being formed substantially at right angles to the plane in which the greater portion of said U-shaped frame member lies, said leg ends being curved outwardly from the legs a sufficient distance such that said leg ends are adapted to engage the top side of the hull of the boat to permit said water vehicle to be used as a ladder to gain entry to said boat from the water.

2. The water vehicle as defined in claim 1 wherein said handles are attached to their respective arms at points intermediate the legs of said frame member; and said planes are carried by said arms at points outside said frame member.

3. The water vehicle as defined in claim 1 wherein said vehicle is comprised substantially of a plastic material.

4. The water vehicle as defined in claim 1 wherein said water vehicle is of such a density that the same is nonfloatable in water when said water vehicle is not in motion.

5. A water vehicle by which a rider may be towed through a body of water by a motor boat or the like, comprising:
a generally U-shaped frame member;
a pair of planes, each plane having an arm extending therefrom in an end-to-end relationship and coupled to one another for relative rotational movement;
means for rotatably mounting said arms to the legs of said frame member such that each plane extends outwardly therefrom, said planes being adapted to rotate independently of one another about the longitudinal axis of its associated arm;
a pair of handles adapted to be operated by said rider, one of said handles carried by one of said plane arms at a point inwardly spaced from said one plane, the other of said handles being carried by the other of said plane arms at a point inwardly spaced from the other plane whereby the rider of said water vehicle can rotate said plane independently of one another by movement of said handles relative to said frame member,
means for mounting a tow line to said frame member, and
a portion of each of said arms being hollow; a ballast material, said ballast material being disposed in the hollow portion of each of said arms.

6. The water vehicle as defined in claim 5 wherein said ballast is removably attached to the hollow portion of said arms.

7. A water vehicle by which a rider may be towed through a body of water by a motor boat or the like, comprising:
a generally U-shaped frame member,
the ends of each of the legs of said frame member being curved a sufficient amount to permit a second rider to grasp the same and to be towed by said water vehicle;
a pair of planes, each plane having an arm extending therefrom;
means for rotatably mounting said arms to said frame member such that each plane extends outwardly therefrom, said planes being adapted to rotate independently about the longitudinal axis of its associated arm;
a pair of handles adapted to be operated by said first-mentioned rider, one of said handles carried by one of said plane arms at a point inwardly spaced from said one plane, the other of said handles being carried by the other of said plane arms at a point inwardly spaced from the other plane whereby the rider of said water vehicle can rotate said plane independently of one another by movement of said handles relative to said frame member;
said leg ends being curved substantially at right angles to the plane in which the greater portion of said U-shaped frame member lies, said leg ends being curved outwardly from the legs a sufficient distance such that said leg ends are adapted to engage the top side of the hull of the boat;
said handles abutting the side of said boat to maintain said ladder a sufficient distance away from said side of said boat to permit said water vehicle to be used as a ladder to gain entry to said boat from the water; and
means for mounting a tow line to said frame member.

8. The water vehicle as defined in claim 7 wherein said handles are carried by said arms at points intermediate the legs of said generally U-shaped member.

9. The water vehicle as defined in claim 8 wherein said arms are in end-to-end relationship and coupled for relative rotational movement, said coupling being of sufficient strength as to withstand the weight of a person.

10. A water vehicle by which a rider may be towed through a body of water by a motor boat or the like, comprising:
a generally U-shaped frame member;
a pair of planes, each plane having an arm extending therefrom, a portion of each of said arms being hollow;
a ballast material disposed in the hollow portion of each of said arms;
means for rotatably mounting said arms to said frame member such that each plane extends outwardly therefrom, said planes being adapted to rotate independently about the longitudinal axis of its associated arm;
a pair of handles adapted to be operated by said rider, one of said handles carried by one of said plane arms at a point inwardly spaced from said one plane, the other of said handles being carried by the other of said plane arms at a point inwardly spaced from the other plane whereby the rider of said water vehicle can rotate said plane independently of one another by movement of said handles relative to said frame member; and
means for mounting a tow line to said frame member.

11. The water vehicle as defined in claim 10 wherein said ballast is removably attached to the hollow portion of said arms.

12. The water vehicle as defined in claim 10 wherein said vehicle is comprised substantially of a plastic material.

13. The water vehicle as defined in claim 10 wherein said arms are rotatably mounted to the legs of said U-shaped frame member.

14. The water vehicle as defined in claim 13 wherein said handles are attached to their respective arms at points intermediate the legs of said frame member, and said planes are carried by said arms at points outside said frame member.

15. The water vehicle as defined in claim 13 wherein said arms are in an end-to-end relationship and coupled to one another for relative rotational movement.

* * * * *